Aug. 15, 1950  J. ROOS, JR  2,518,820
CONTROL CASING
Filed Nov. 1, 1947  2 Sheets-Sheet 1
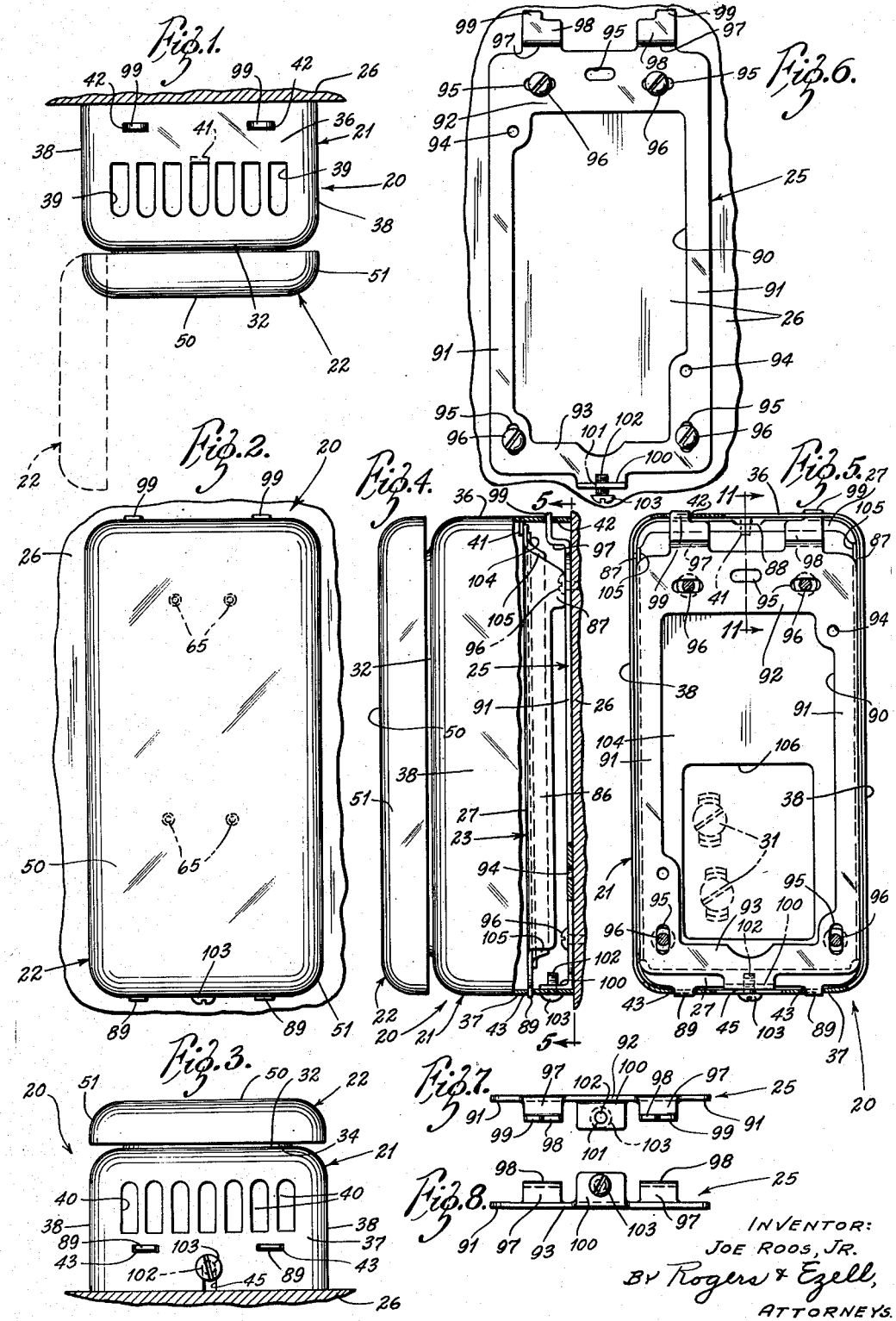
INVENTOR:
JOE ROOS, JR.
BY Rogers & Ezell,
ATTORNEYS.

Aug. 15, 1950  J. ROOS, JR  2,518,820
CONTROL CASING
Filed Nov. 1, 1947  2 Sheets-Sheet 2
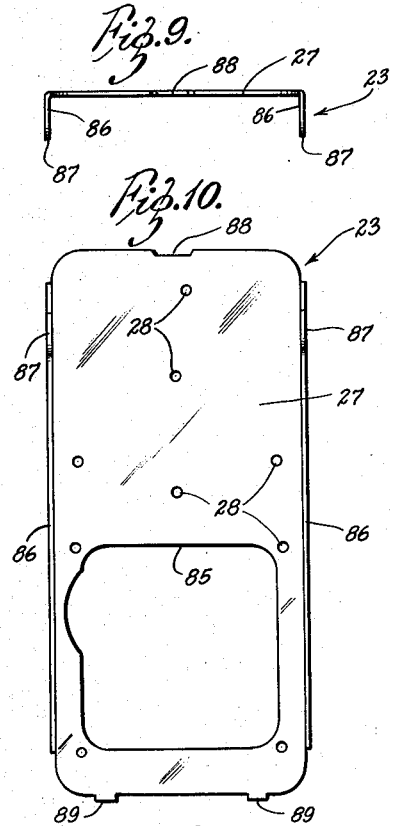
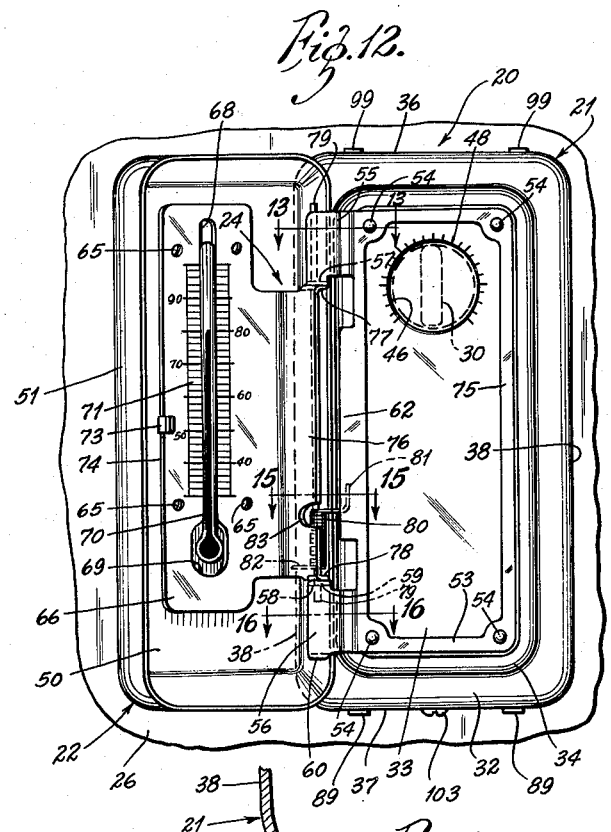
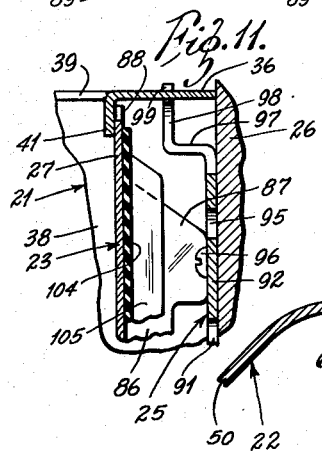
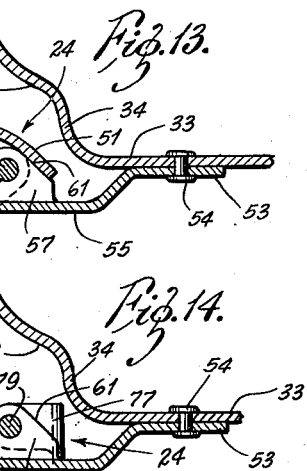
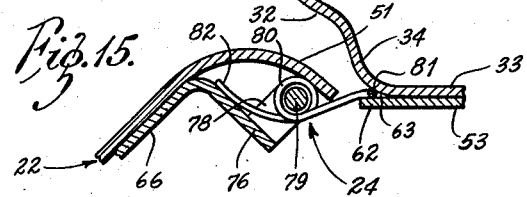
INVENTOR:
JOE ROOS, JR.
BY Rogers & Ezell
ATTORNEYS.

Patented Aug. 15, 1950

2,518,820

UNITED STATES PATENT OFFICE 2,518,820

CONTROL CASING

Joe Roos, Jr., St. Louis, Mo., assignor to Missouri Automatic Control Corporation, St. Louis, Mo., a corporation of Missouri Application November 1, 1947, Serial No. 783,467

4 Claims. (Cl. 297—11)

The present invention pertains generally to casings or housings for enclosing a control mechanism, particularly a room thermostat, or the like. The invention further concerns novel mounting means whereby the invention may be attached easily and quickly to a vertical surface, such as the wall of a room.

The principal object of the invention is to provide a casing which conceals the elements included in a thermostat mechanism; which presents a pleasing appearance both when the cover thereof is in a closed as well as in an open position, and which may be readily mounted in a selected locality on the wall of a room.

Another object of this invention is to provide a cover which, when in closed position, conceals the casing; which, when in open position, presents to view a temperature indicating device; and which is normaly maintained in closed position by spring means associated therewith and with said casing.

A further object is to provide a casing of such construction that convenient manipulation of the indicator for the control mechanism is afforded to a person who swings the cover from closed to open position.

Another object is to provide a cover so spaced from the casing that ambient room temperature has ready access to, and may be visibly registered on, the temperature indicating means attached to the cover member.

Another object is to provide ventilation for the enclosed control mechanism by forming a series of openings in the top and bottom walls of the casing.

Other features and advantages of the invention will be referred to in the description to follow, reference being had also to the accompanying drawings, in which:

Fig. 1 is a top plan view of the casing included in the present invention, mounted on a vertical wall or the like, said wall being shown in horizontal section, and the cover of the casing being closed;

Fig. 2 is a front elevational view of the assembly shown in Fig. 1;

Fig. 3 is a bottom plan view thereof;

Fig. 4 is a side elevational view thereof, with a portion of the casing broken away to illustrate certain features of the device;

Fig. 5 is a rear elevational view with parts in section, the view being taken substantially on the line 5—5 of Fig. 4;

Fig. 6 is a front elevational view of the mounting plate of the invention, shown secured to a wall or the like, in position to receive the casing;

Fig. 7 is a top plan view of said mounting plate;

Fig. 8 is a bottom plan view thereof;

Fig. 9 is a top plan view of the plate to which the mechanism of the control is attachable;

Fig. 10 is a rear elevational view thereof;

Fig. 11 is a vertical sectional view through the upper portion of the assembled casing taken on the line 11—11 of Fig. 5;

Fig. 12 is a front elevational view of the invention with the cover in open position;

Fig. 13 is a horizontal sectional view on the line 13—13 of Fig. 12;

Fig. 14 is a similar view with the cover in closed position;

Fig. 15 is a horizontal sectional view on the line 15—15 of Fig. 12; and

Fig. 16 is a similar view on the line 16—16 of Fig. 12.

The control assembly of the present invention is indicated generally in Figs. 1 through 5, and in Fig. 12, by the numeral 20. This assembly may be said to consist of five major parts. These include a casing, generally designated 21, to enclose and conceal the elements of the control mechanism; a cover member, generally designated 22; a plate, generally designated 23, which is insertable into and removable from the casing to support said control mechanism; a hinge assembly, generally designated 24, to connect the cover member at one side thereof to the casing; and a plate, generally designated 25, adapted to be secured to a wall 26 for the reception and retention of the foregoing assembled elements, and the control mechanism therein contained.

As is evident from an inspection of the drawings, the invention is not concerned with any particular thermostat mechanism, and none such has been illustrated.

In other words, the web portion 27 of the plate 23, to which conventional mechanism of this character may be secured, is shown to have a plurality of threaded apertures 28, adapted to receive fastening elements whereby said mechanism can be secured thereto. Obviously, the location as well as the number of these apertures is dependent upon the structural details of the control mechanism.

Although not deemed necessary, it may be said that the thermostat mechanism herein referred to is of the type used in the remote control of a furnace or the like, in the home, or elsewhere.

Therefore, it is noted that, whereas such mechanisms may vary in details of construction, each of them includes a manually operable indicator, such as that shown in broken lines in Fig. 12, and designated 30, and binding posts for the electrical connections, such as those shown in broken lines in Fig. 5, and indicated 31.

With particular reference now to the casing 21, it includes a front face 32 which merges into an integral forwardly offset panel portion 33, being joined thereto by a continuous peripheral supporting flange 34. As best seen in Figs. 13 and 14, this flange is of reversely curved configuration to present a pleasing appearance, and simultaneously to strengthen the casing.

The casing also includes an integral top wall 36, a bottom wall 37, and side walls 38, but is open at the rear. A series of elongated air inlets 39 is provided in the top wall 36, and a similar series of air inlets 40 in the bottom wall 37.

Preferably, as shown particularly in Fig. 11, one of the top wall openings 39, located on the vertical center line of the device, has its rear marginal edge defined by an integral depending flange portion or lug 41, the purpose of which will be hereinafter explained.

The top wall 36 has also formed therein, in predetermined spaced relation, a pair of rectangular slots 42, and the bottom wall 37 has formed therein a similar pair of slots 43, the latter slots, however, being forwardly disposed relative to the former slots for reasons to appear. Centrally thereof, and at the rear, the bottom wall is also provided with an open-ended slot or notch 45.

The forwardly offset panel 33 has a circular opening 46 therein, through which the indicator 30 projects. Adjacent this opening, the panel has marked thereon a dial 48 in association with the indicator, as is understood.

Obviously, the number and location of such indicator and dial combinations may vary to suit the requirements of the particular mechanism enclosed and supported by the casing.

With particular reference now to the cover 22, it is noted that it comprises a front panel portion 50 merging into an integral flange 51 extending around the entire periphery of the panel, the flange being of arcuate configuration, as best seen in Figs. 13, 14 and 15. The cover is preferably at least coextensive with the casing 21, so that, when the cover is closed, the casing is concealed from view.

The novel arrangement whereby the cover is hingedly secured to the casing and the means to render the cover self-closing will now be described, with particuar reference to Figs. 12 through 16. In these views, it is seen that an ornamental frame 53 is secured to the offset panel 33 by rivets 54.

This frame has integral therewith forwardly offset upper and lower extensions 55 and 56, the upper of which has a horizontal rearwardly projecting ear 57, and the lower of which has a similar ear 58.

There is a circular aperture 59 in each of said ears, and the lower extension 56 has, in addition, a rearwardly extending projection 60 thereon as particularly illustrated in Fig. 16. This projection, together with an inclined edge 61 on the ear 57 serves to limit swinging the cover rearwardly farther than necessary.

Intermediate the extensions 55 and 56, the left side rail of the frame 53 is widened as at 62, so as to provide a vertically extending pocket 63 between its lateral edge and the flange 34, as best shown in Fig. 15.

Secured to the inner face of the panel portion 50 of the cover, as by screws 65, is a hinge plate 66 of the configuration illustrated in Fig. 12.

The screws 65, which may penetrate the panel, have their ends flush with the outer face thereof, but are indicated in broken lines in Fig. 2, it being understood that a coating of enamel applied to the cover conceals them.

The plate 66 has a vertically disposed elongated slot 68 therein, terminating in an enlargement 69 at its lower end. This slot surrounds a thermometer 70, which is permanently retained therein by any suitable means. A temperature indicating scale 71 is marked on the plate 66.

To the left of the thermometer 70, as viewed in Fig. 12, there is provided a projection 73 extending from the marginal edge 74 of the plate 66, and integral therewith. This projection, when the cover 22 is in its closed position, is in contact with the rail 75 of the frame 53.

To the right of the thermometer 70, the plate 66 is reduced in extent and terminates in a flange 76 which extends at right angles to the body portion of the plate, as illustrated particularly in Figs. 13 through 15. An integral laterally projecting ear 77 is provided at the upper end, and a similar ear 78 at the lower end, of the flange 76. Each of these ears has a circular aperture therein similar to the apertures 59.

In the assembled device, the apertures in the ears 77 and 78 are in vertical alinement with the apertures 59, and through them all extends a slender rod or hinge pin 79, whereby the cover and casing are connected. The parts are so designed that the ear 77 lies adjacent the ear 57, and the ear 78 lies adjacent the ear 59. Thus, although horizontal swinging movements of the cover are freely had, vertical movement thereof is restricted.

Surrounding the hinge pin 79 is a spiral spring 80, the upper end 81 of which is seated in the pocket 63, and the lower end 82 of which bears against the flange 76, to continuously bias the cover for normally maintaining it in its closed position, and for automatically returning said cover from a manually opened to a closed position. A suitable recess or notch 83 in the flange 76 is provided to facilitate insertion of the spring end 81 into the pocket 63 during assembly operations. The spring arrangement can be seen to best advantage in Fig. 15.

With particular reference now to Figs. 4, 9, 10 and 11, the mechanism-supporting plate 23 has formed therein, in addition to the apertures 28, a large opening 85 to accommodate electrical connections, such as, for example, the binding posts 31. A reinforcing flange 86 also extends right angularly from each side of the plate, the upper end of each flange being extended to provide an abutment portion 87 for a purpose to later appear. The upper edge of the plate 66 is indented or notched as at 88, and depending from the lower edge thereof is a pair of extensions, or lugs, 89. These lugs are slightly smaller than the slots 43 and are so spaced that they are readily insertable thereinto, as will appear.

Attention is directed to Figs. 6, 7 and 8, in which the mounting plate 25 of the invention is illustrated in detail. It is of more or less skeleton form, a large opening 90 of the configuration shown resulting in the provision of side rail portions 91, a top rail portion 92, and a bottom rail portion 93. There is a plurality of circular apertures 94, and elongated apertures 95 in said rails, as shown. Screws 96 may pass through a selected number of these opening and enter the wall 26 to fasten the plate thereto. Lateral as well as horizontal positioning of the plate is facilitated by the elongated openings 95, as is understood. The plate may also be secured to the wall by screws passing through the openings 94.

Extending forwardly from the upper edge of the plate is a pair of spaced angular extensions, each including a horizontal portion 97 and a vertical portion 98. Each vertical portion has an upwardly projecting extension or lug 99 slightly smaller than, and so spaced, as to be insertable into the slots 42 of the casing 21.

Extending forwardly from the lower edge of said plate, and on the center line thereof, is a horizontal flange 100 provided with a threaded aperture 101. This aperture is engaged by the shank portion of a screw 102, which has a head 103 of greater diameter than the width of the slot 45 in the bottom of the casing 21.

A sheet of dielectric material 104, having side flanges 105 right angularly bent from the body portion thereof, may be fitted against the rear face of the plate 23. It has a relatively large rectangular opening 106 therein, slightly smaller than the opening 85 in said plate.

Although the advantages inherent in the control casing of the present invention and its associated mounting means should be apparent from the foregoing description, together with an inspection of the drawings, a brief resumé of them may be beneficial.

Proceeding on this assumption, attention is directed to the novel manner whereby the plate 23, which supports the assembly comprising the thermostat mechanism, is insertable into and removable from the casing.

Assuming that a mechanism of such character has previously been secured to said plate, the latter is put in place by inserting the depending lugs 89 into the slots 43, and thereafter bringing the upper edge of the plate against the depending stop 41 of the cover, as portrayed in Fig. 11.

The flanges 86, at this time, yieldably engage the inner surfaces of the side walls 38, so that fortuitous displacement of the plate in handling the casing is obviated. Should it be required to remove the plate for inspection or repair of said mechanism, the notch 88 is provided to accommodate a suitable tool for the purpose.

Assuming that it is desired to install the assembled control casing, the mounting plate 25 is securely attached to the wall as previously explained. Thereupon, the lugs 99 are inserted into the slots 42 and the lower end of the casing is swung toward the wall, until the adjacent peripheral edge of the casing is flush therewith.

During the latter movement, the threaded shank of the screw 102 enters the open-ended slot 45, with portions of the bottom wall 37 adjacent said slot passing between the flange 100 and the head 103 of said screw. With the parts in this position, the screw is tightened. To remove the casing, the reverse procedure is followed.

As shown in Fig. 4, the extensions 87 are in contact with the plate 25 at this time. Thus, the upper portion of the mechanism-supporting plate 23 is rigidly maintained against the lug 41.

In its closed position, the cover is maintained in spaced relation to the casing by the forwardly offset members 55 and 56, in cooperation with the projection 73.

The electrical connections leading to the device to be regulated may be fed into an opening formed in the wall after the mounting plate 25 has been attached, as in Fig. 6.

Whereas the preferable embodiment of the invention illustrated and described has been found particularly advantageous, modifications in the construction may obviously be made within the scope of the following claims.

What is claimed is:

1. A casing to contain and conceal an assembled control mechanism, said casing including top, bottom and side wall portions, a face portion merging into a forwardly offset panel portion, at least one opening surrounded by a dial in the panel, a series of ventilation openings in both the top and bottom walls, an integral flange depending from the rear marginal edge of one of the ventilation openings in said top wall, and a pair of spaced elongated slots formed in said bottom wall, in combination with a supporting plate for said assembled control mechanism, said plate including a pair of spaced depending lugs adapted to enter said slots, and a pair of side marginal flanges adapted to yieldingly engage the inner surfaces of said side wall portions, the upper edge of said plate abutting said flange which depends from the top wall portion of the casing.

2. In a casing of the character described, a vertical flange on the centerline of the casing depending from the top wall thereof in predetermined spaced relation to the rear peripheral edge thereof, a pair of spaced elongated slots formed in the bottom wall of the casing also in predetermined spaced relation to said peripheral edge, and a plate provided with means for securing a control mechanism thereto, said plate including a body portion, a substantially rectangular opening therein, a reinforcing flange extending right angularly from each side of the plate, an integral rearwardly extending abutment member at the upper end of each flange, a notch formed in the top edge of the plate, and a pair of spaced lugs depending from the bottom edge of said plate, the latter adapted to enter the pair of slots aforesaid in the bottom wall of said casing for positioning the plate within the casing in spaced relation to the said rear peripheral edge thereof.

3. In a construction of the character described, a casing, a cover member hingedly secured to one side thereof, an offset panel portion on the casing, and an ornamental frame secured to said panel portion, said frame including a forwardly offset upper extension and a similar lower extension, a horizontally disposed ear projecting from the lower portion of the upper extension, an inclined abutment edge on said ear, a horizontally disposed ear projecting from the upper portion of the lower extension, an inclined abutment edge on said ear, a circular aperture in each of said ears, and a stop member projecting from the lower portion of said last-named extension to limit the swinging movements in one direction of the cover member aforesaid.

4. In a construction of the character described, a casing including a bottom wall provided with a pair of spaced elongated slots, and a plate for supporting a control mechanism within said casing, said plate including a body portion, a plurality of threaded apertures and a relatively large substantially rectangular opening therein, a right angularly bent marginal flange at either side thereof, an extended abutment portion at the upper end of each flange, a notch formed in the top edge, and a pair of lugs depending from the bottom edge of the plate, said lugs being so spaced as to be insertable in said pair of elongated slots provided in the bottom wall of said casing.

JOE ROOS, Jr.

REFERENCES CITED

The following references are of record in the file of this patent:

UNITED STATES PATENTS

| Number | Name | Date |
|---|---|---|
| 1,283,749 | Hauer | Nov. 5, 1918 |
| 1,720,020 | Vance | July 9, 1929 |
| 2,155,760 | Hy | Apr. 25, 1939 |
| 2,160,623 | Persons | May 30, 1939 |
| 2,162,296 | Chappell | June 13, 1939 |
| 2,171,273 | Cunningham | Aug. 29, 1939 |
| 2,246,705 | Tyree | June 24, 1941 |
| 2,254,515 | Clark | Sept. 2, 1941 |
| 2,279,544 | White | Apr. 14, 1942 |
| 2,287,494 | McCabe | June 23, 1942 |
| 2,332,471 | Rickmeyer | Oct. 19, 1943 |
| 2,450,722 | Drije | Oct. 5, 1948 |